United States Patent [19]
Girard et al.

[11] Patent Number: 6,144,406
[45] Date of Patent: Nov. 7, 2000

[54] ELECTRONIC PANORAMIC CAMERA

[75] Inventors: Pierre Girard, St-Marc sur Richelieu; Jean-Guy Pelletier, Chambly; Jean Côté, Ste-Julie, all of Canada

[73] Assignee: Hydro-Quebec, Montreal, Canada

[21] Appl. No.: 08/886,144

[22] Filed: Jun. 30, 1997

[30] Foreign Application Priority Data

Dec. 24, 1996 [CA] Canada ................................. 2194002

[51] Int. Cl.$^7$ .................................................. H04N 5/225
[52] U.S. Cl. ............................................ 348/211; 348/37
[58] Field of Search .................................. 348/207, 211, 348/212, 213, 222, 231, 239, 373, 374, 375, 294, 311, 312, 335, 340, 36, 37, 38, 39, 82, 83, 84, 85, 143; 396/19, 20, 21; H04N 5/225

[56] References Cited

U.S. PATENT DOCUMENTS

| 4,153,917 | 5/1979 | Catano et al. | 348/36 |
| 4,355,329 | 10/1982 | Yoshida et al. | 348/36 |
| 6,034,716 | 10/1982 | Whiting et al. | 348/36 |

OTHER PUBLICATIONS

Photographier la ville . . . Les panoramas sur sels d'argent, Michel Lessard, Photo Sèlection Nov. 1990, pp. 35–39.
"See you Around", Tom R. Halfhill, Byte, May 1995, pp. 85 to 90.
"Microsoft requiert l'expertiee de Denis Tremblay", Gilles Bèrubè, "Le Canada Français", Jan. 4, 1995, p. A–32.
"Les bons techniciens derrière les bonnes machines", Gilles Bèrubè, "Le Canada Français", Jan. 4, 1995, p. A–33.
Peace River Studios http://www.peaceriverstudios.com/3sxty.html.
The Panoramic Imaging Zone http://ourworld.compuserve.com/homepages/radio.
The Panoramic Imaging Zone: Experiments http://ourworld.compuserve.com/homepages/radio.
The Panoramic Imaging Zone: Cameras (The Globuscope) http://ourworld.compuserve.com/hompages/radio.
The Panoramic Imaging Zone: Cameras (The Cirkut Camera and the Cirkut Outfit) http://ourworld.compuserve.com/homepages/radio.
QuickTime VR http://qtvr.quicktime.apple.com.
Kaidan Quickpan 0TVR http://www.kaidan.com.
MIS–Meteorology Instrument System http://barsoom.mss.com/http/new–directories/mars/mars9x/smallstationpayload.html.
Mars 96 Penetrator Science Payload http://barsom.mss.com/http/new_directories/mars/mars9X/penetratorpayload.html#1.

Primary Examiner—Tuan Ho
Attorney, Agent, or Firm—Foley & Lardner

[57] ABSTRACT

The panoramic camera according to the invention has a housing having first and second sections, coaxial with a rotation axis. The second section can be driven in rotation about the axis with respect to the first section by a motor connected to a gear. A lens is mounted on the second section of the housing and is both perpendicular and radial to the axis. A linear CCD array is placed at the focal point of the lens in order to capture the images transmitted by the lens. An analog-to-digital converter is connected to the CCD array to convert the analog signal generated by the CCD array into digital information. The digital information is stored on a hard disk drive, and includes data corresponding to the azimuth of the camera. Finally, a micro-computer controls the rotation of the housing, sends a control signal to the analog-to-digital converter to digitize the image and sends a control signal to the hard disk drive to save the digital information generated by the converter.

19 Claims, 6 Drawing Sheets

ELECTRONIC PANORAMIC CAMERA

FIELD OF THE INVENTION

The present invention is an electronic panoramic camera.

DESCRIPTION OF THE PRIOR ART

Traditional panoramic cameras use ordinary photographic film, mounted in a housing that can be driven to rotate as the film advances. The rotation of such cameras is synchronized with the advancement of the film to imprint a panoramic view on the film. In general, such cameras may rotate anywhere between 0° to 360°.

The disadvantage of such cameras is that the user must wait until the film is processed before being able to view the results. This processing may take anywhere between a few hours to a few days. Furthermore, the exposure time for a film is relatively long, a disadvantage for certain applications. For example, in the case of underground network management, be it electrical, telephone or other cables, it is common to regularly map the cables in order to evaluate the capacity of the network and growth potential.

Previously, such mapping was done manually by a person descending into an access well and drawing the cables. Alternatively, one may use an ordinary camera and take a series of photographs, accompanied with the drawback of bad lighting and lack of spatial reference points. Furthermore, in the case of power cables, there is the inherent risk of explosion of cables under power. It is thus preferable to limit the number of people descending into an access well.

There also exists other types of cameras which use a wide angle lens to try to obtain a panoramic view. However, the viewing field of such a lens is approximately 180°. Thus, in order to obtain a panorama of 360°, a user must "glue" at least two of these panoramas together, an act which requires a high degree of precision when assembling the two panoramas.

SUMMARY OF THE INVENTION

It is an object of the invention to provide an electronic panoramic camera. In accordance with the invention, this object is achieved with a panoramic camera comprising a housing having a longitudinal axis. The housing includes a first section coaxial with the axis and a second section also coaxial with the axis. The second section can be driven into rotation with respect to the first section, about the axis, by means for driving in rotation the section section of the housing.

A lens is mounted, an optical axis thereof being perpendicular and radial to the axis, on the second section of the housing.

A linear CCD array is placed at the focal point of the lens in order to capture images transmitted by the lens, the CCD array having an input for a control signal and an analog output signal representing one line of the image.

An analog-to-digital converter is operatively connected to the linear CCD array for converting the analog signal output of the CCD array into digital information, the converter having an input for the analog signal, an input for a control signal and an output for digital information.

Means are provided for storing the digital information sent by the converter.

Means for encoding the azimuth of the camera are also provided, these means having an output for data corresponding to the azimuth.

A control system is provided for controlling the rotation of the housing, for sending a control signal to the analog-to-digital converter to digitize the image, and for sending a control signal to the means for storing the digital information transmitted by the converter.

In use, when the second section of the housing is driven into rotation, the control system sends, on one hand, a control signal to the analog-to-digital converter at regular intervals to indicate to the converter to digitize the image and, on the other hand, sends a signal to the means for storing the digital information to store the digital information sequentially, including the data corresponding to the azimuth.

This panoramic camera is particularly well adapted for taking panoramic views of various landscapes or for taking a 360° view of a room, a hall or an access well. The advantage of this camera is that a user may immediately view the image as it is being taken, and can store the image in a digital form for subsequent manipulation, preferably with a computer system.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

The following description of the invention, and that which is illustrated, according to a preferred embodiment of the invention, will be made with reference to a camera adapted to take panoramic views of an access well of an underground network. More particularly, in the case of an underground power network, it is dangerous to have a person present in the well when the cables are under power as there exists the risk of an explosion. Accordingly, it is advantageous to lower the camera according to the invention in the access well to take a panoramic view and thus reduce the risk of injury to a person descending into the well. However, it should be understood that the following described camera may be used to take any other panoramic view.

The advantages of the camera according to the invention are its speed in taking a panoramic view, the possibility to immediately view the results and the possibility to manipulate the image using appropriate software.

The panoramic camera 1 according to the invention, as it is illustrated, includes a housing 10 having a longitudinal axis 2. The housing 10 includes a first section 3 coaxial with the longitudinal axis 2 and a second section 5 also coaxial with the axis 2. The second section 5 can be driven in rotation about the longitudinal axis 2 with respect to the first section 3 by way of means 100 for driving in rotation (not shown on FIG. 1). To that effect, the second section 5 of the housing 10 is connected to the first section 3 by a ball bearing 71, mounted on a shaft 60 coaxial with the axis 2, at the lower portion 61 of the shaft 60.

Figure 2:
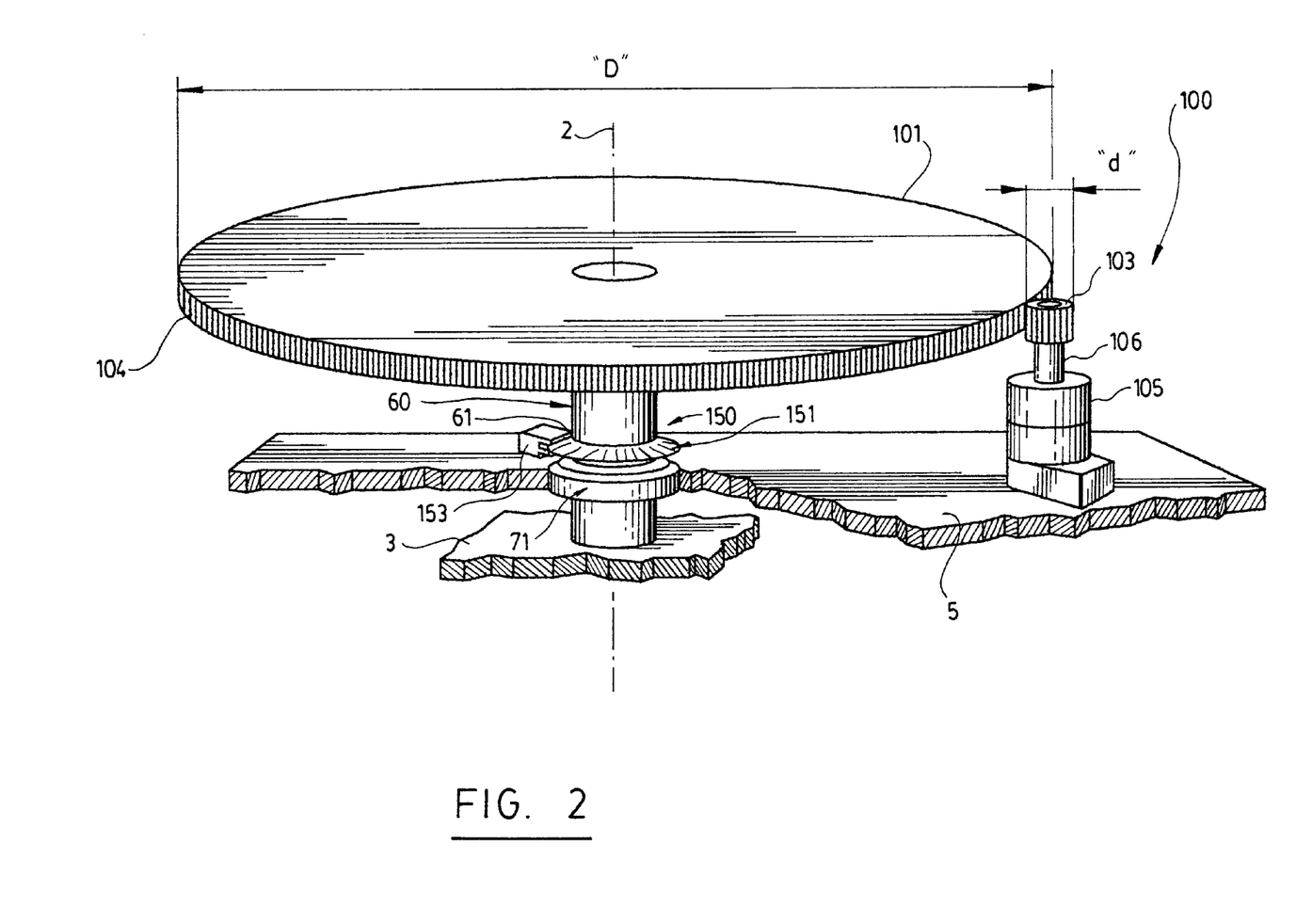
FIG. 2 is a schematic view of a first type of means for driving in rotation the housing of the camera of FIG. 1.
Figure 3:
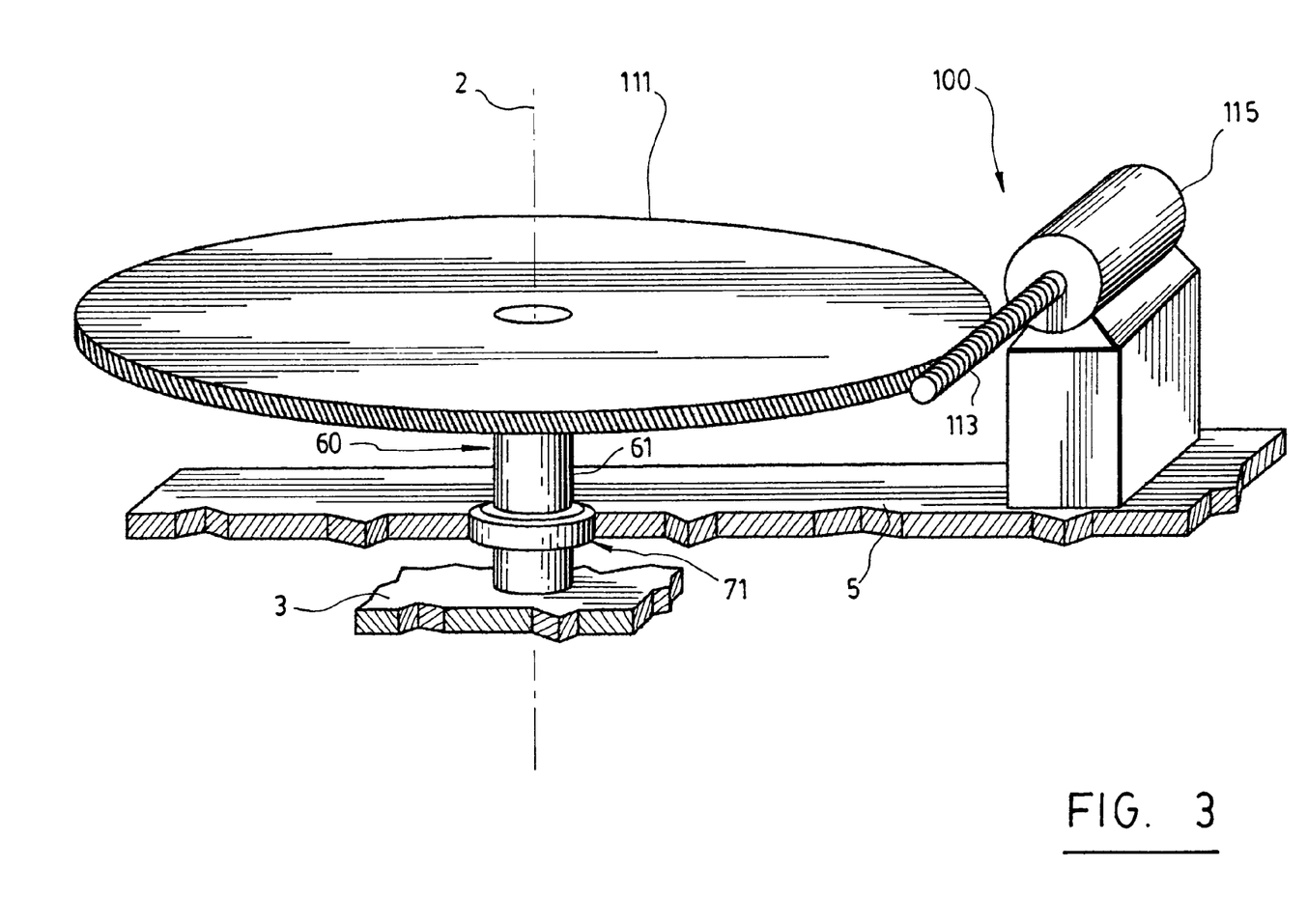
FIG. 3 is a schematic view of a second type of means for driving in rotation the housing of the camera of FIG. 1.

FIGS. 2 and 3 represent two different means 100 possible for driving in rotation the second section 5 of the housing 10, according to the invention. It should however be understood that other means for driving in rotation the second section 5 of the housing 10 can also be used.

In FIG. 2, the means 100 for driving in rotation the second section 5 of the housing 10 comprise a gear having a first wheel 101 coaxial with the axis 2. This first wheel 101 is fastened to the first section 3 of the housing 10 and has a diameter D and a toothed circumference 104. The gear has a second wheel 103, having a much smaller diameter d than the diameter D of the first wheel 101. The second wheel 103 can travel along the circumference 104 of the first wheel 101 and has an axis of rotation parallel to the longitudinal axis 2.

The second wheel 103 is driven by a motor 105 upon reception of a control signal. The second wheel 103 is mounted on an output axis 106 of the motor 105. The driving in rotation of the second wheel 103 by the motor 105 causes the second wheel 103 to turn relative to the first wheel 101. The motor 105 is fastened to the second section 5 of the housing 10.

In FIG. 3, the means 100 for driving in rotation the second section 5 of the housing 10 comprise a gear wheel 111 whose periphery is in contact with an endless screw 113. The endless screw 113 is driven by a motor 115, preferably of stepper type, fastened to the second section 5 of the housing 10. The driving of the endless screw 113 forces the second section 5 of the housing 10 to rotate relative to the first section 3.

Figure 1:
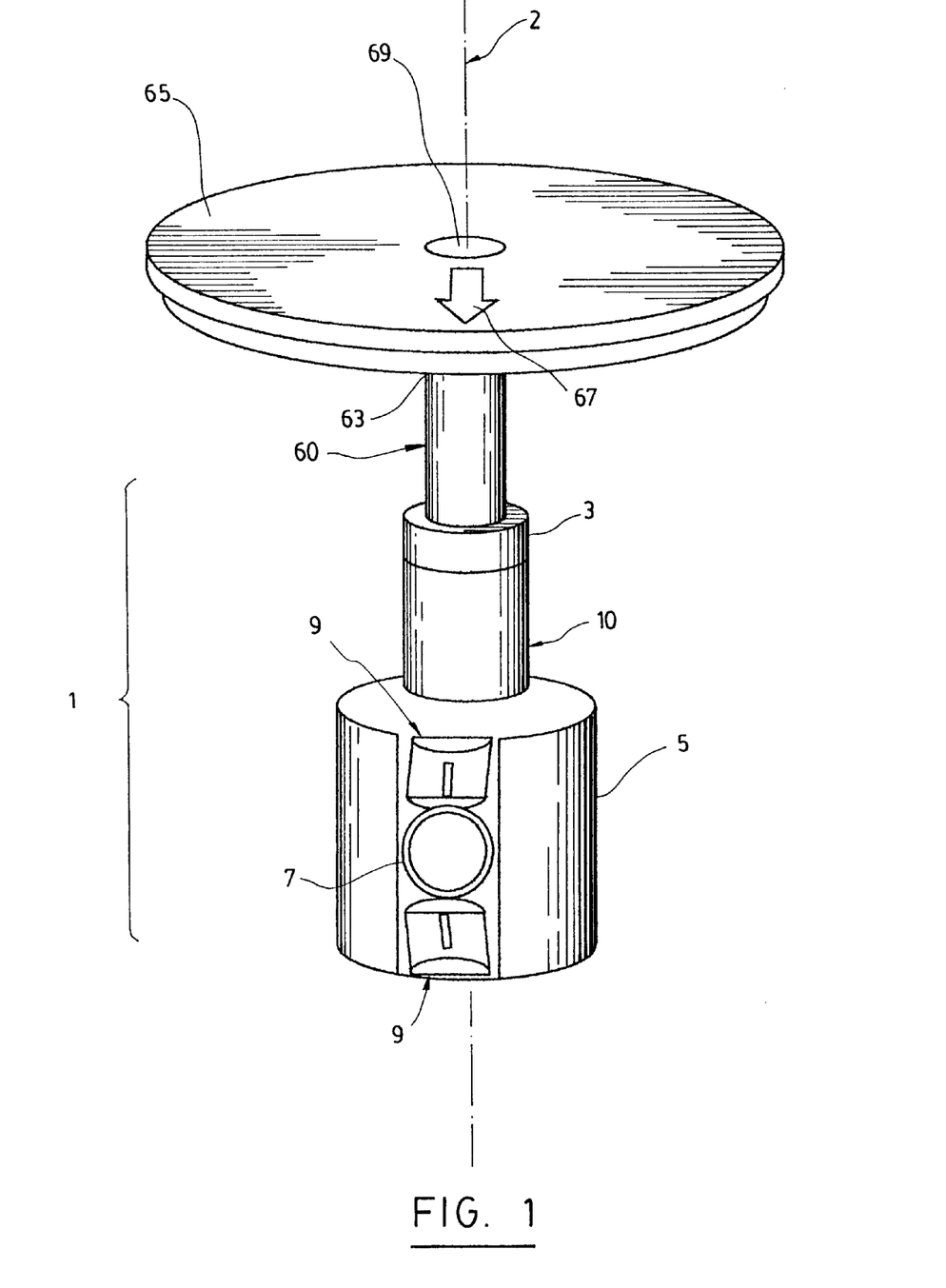
FIG. 1 is a schematic view of the panoramic camera according to a preferred embodiment thereof.

As shown on FIG. 1, a lens 7 is mounted on the second section 5 of the housing 10. An optical axis of lens 7 is both perpendicular and radial to the longitudinal axis 2. Preferably, this lens 7 is a wide angle lens.

Figure 4:
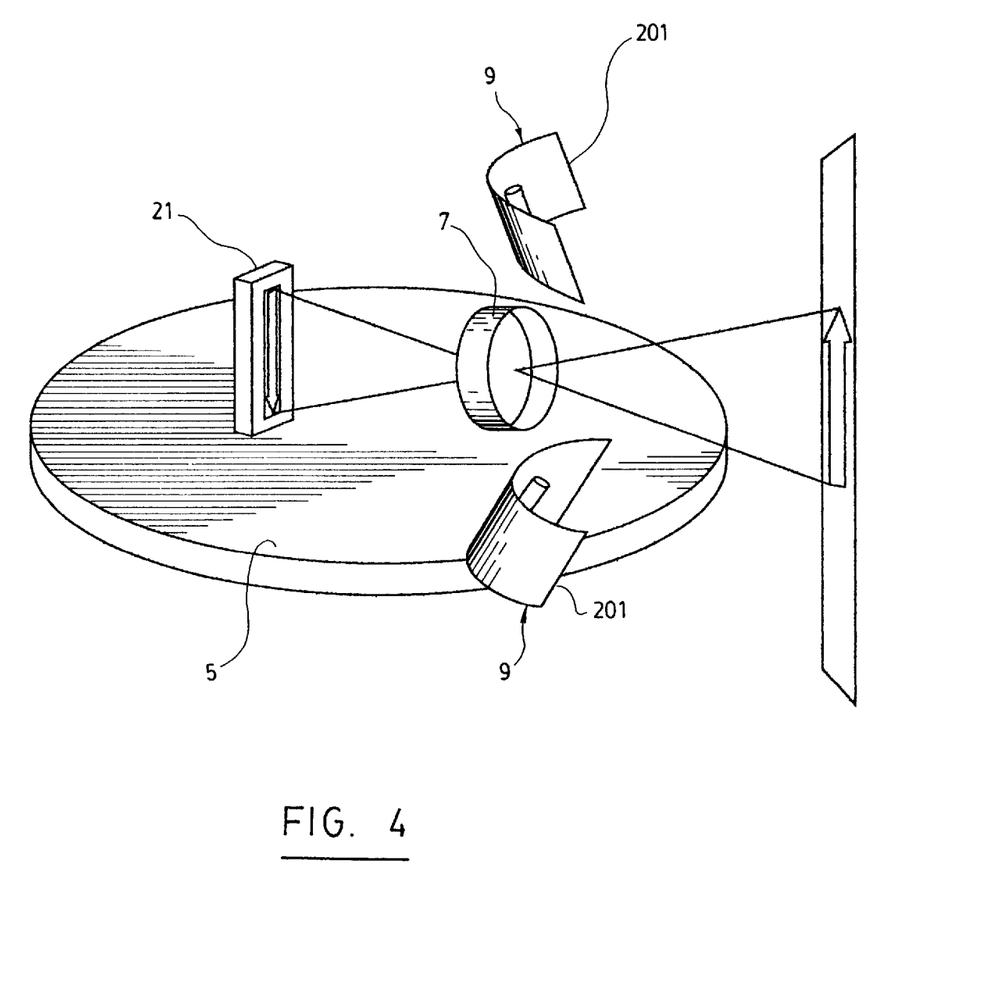
FIG. 4 is a schematic representation of the lighting system according to a preferred embodiment.
Figure 8:
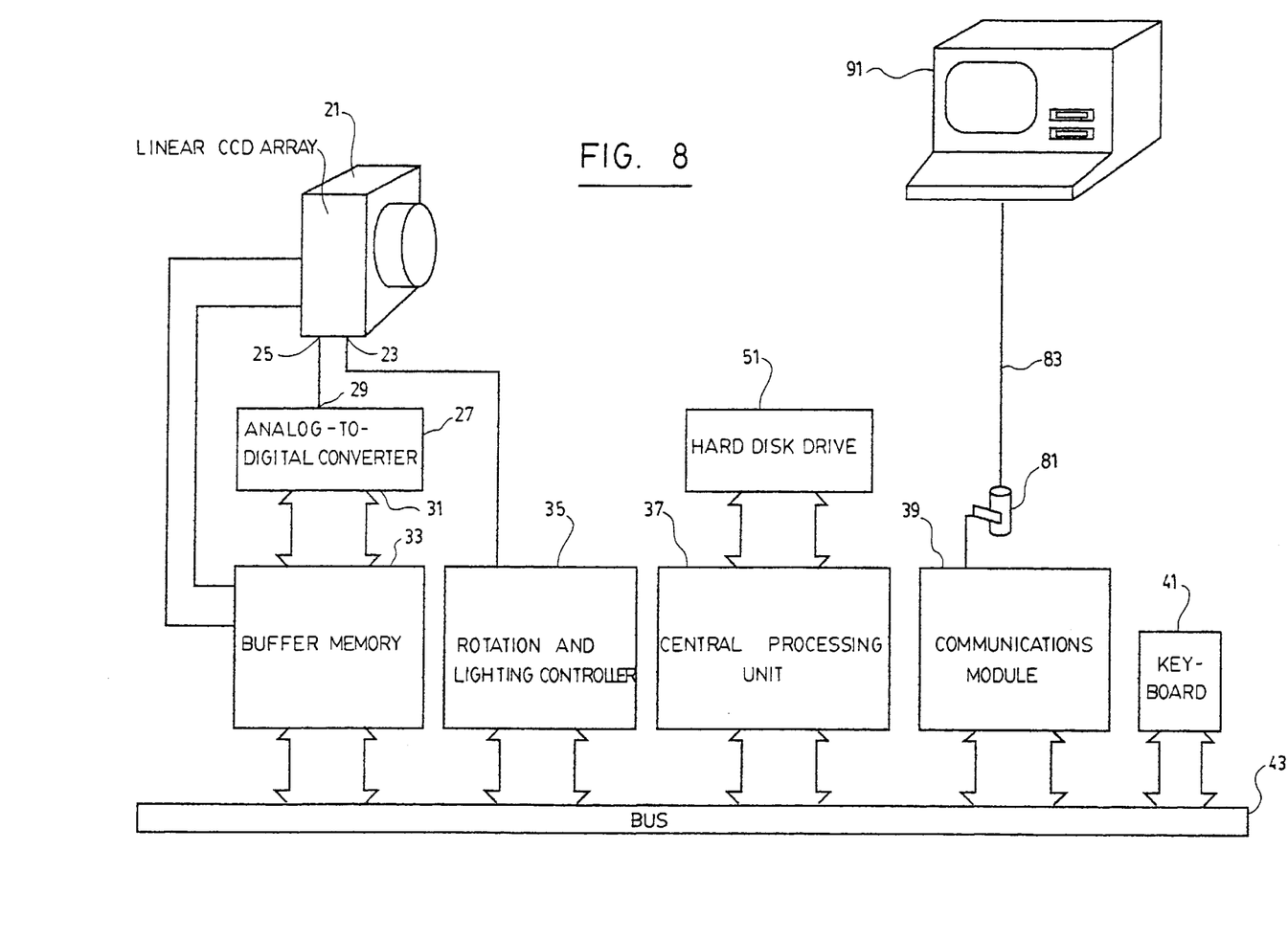
FIG. 8 is a schematic representation of the operation of the camera of FIG. 1.

As better shown on FIGS. 4 and 8, a linear CCD array 21 is placed at the focal point of the lens 7 in order to receive the images transmitted by the lens 7. The CCD array 21 has an input 23 for a control signal and an analog output 25. An analog-to-digital converter 27 is operationally connected to the CCD array 21 to convert the analog signal into a digital form. The converter 27 has an input 29 for a control signal and an output 31 for digital information.

The CCD array 21 is preferably a three color linear array, thus having an analog output for each of the colors. As such each line of image could be digitized as a function of three basic colors. However, for the purposes of using the camera 1 for mapping an underground access well, only the output representing the color red is used, because it is at this wavelength that the array is most sensitive. Furthermore, since underground access wells are relatively monochrome, only one color is really necessary.

Preferably, to obtain good resolution for the image, each line of the CCD array 21 is composed of 2048 pixels.

Thus, when the analog signal is sent to the analog-to-digital converter 27, each of the pixels is digitized, preferably in a word of 8 bits per pixel, again to obtain good resolution. However, for other applications, it may be advantageous to digitize each pixel in words of 16 or 32 bits, depending on the resolution that is required.

The analog-to-digital converter 27 is preferably of the type "flash" or "successive approximation". The analog-to-digital converter 27 preferably includes a video amplifier at its input to obtain a proper amplitude for the pixels.

In order to store the digitized images, the panoramic camera 1 also includes means 51 for storing the digital information outputted by the analog-to-digital converter 27, the means 51 preferably being a hard disk drive. However, it should be understood that other means 51 can be used provided that the images so stored by the means 51 can be subsequently retrieved.

Means 150 are provided to encode the azimuth of the camera. These means 150 have an output for data corresponding to the azimuth. As shown on FIG. 2, the means 150 for encoding the azimuth may include an azimuth wheel 151 and an optical encoder 153. The optical encoder 153 has an output for sending synchronization signals to a rotation controller 35, said signals being retransmitted to the CCD array 21.

A control system is incorporated to the camera 1 for controlling the rotation of the housing 10, for sending a control signal to the analog-to-digital converter 27 to digitize the image and for sending a control signal to the means 51 for storing the digital information sent by the converter 27.

The control system illustrated on FIG. 8 includes the rotation and lighting control 35, a central processing unit 37, a communications module 39, which is preferably a serial communications module, and a keyboard 41. Preferably, the control system also includes a buffer memory 33 operatively connected to the analog-to-digital converter 27. Other units may be included to complete this arrangement without departing from the spirit and scope of the invention. Furthermore, all of the modules are schematically illustrated on FIG. 8 and it should be understood that all of these could be integrated in a single module, as long as the basic functions are present.

Preferably, all of the units of the control system are interconnected through a communications bus 43, preferably one which is generally referred to as "ISA/PC-104".

Preferably, the control system is a micro-computer.

In use, when the second section 5 is driven in rotation, the control system sends a signal to the analog-to-digital converter 27 at regular intervals to indicate to the converter that the image is to be digitized and sends a signal to the means for storing the digital information to store the digital information sequentially, including data corresponding to the azimuth generated by the means 150 for encoding the azimuth.

More particularly, when a command is given to take a panoramic view, the central processing unit 37 sends a signal to the rotation and lighting controller 35. A signal is sent to the means 100 for driving in rotation the second section 5 of the housing 10. At regular intervals, preferably 4' of arc resulting in an image of approximately 5000 lines, the optical encoder 153 sends a signal to the CCD array 21 to send the analog information representing one line of image to the analog-to-digital converter 27, which then digitizes each pixel. Once the pixels are digitized, they are stored in the memory buffer 33. When the CCD array 21 transmits the analog information to the analog-to-digital converter, the CCD array 21 sends a signal to the buffer memory representing the information on the pixels and on the line that was digitized, i.e. the data corresponding to the azimuth generated by the means 150 for encoding the azimuth. This information is stored with the information representing the digitized pixels. Thus, each time a line of information is digitized and stored, it also contains the information with respect to each pixel and to the azimuth of the camera. This information is subsequently extracted. Therefore, when the camera is used for mapping an underground access well, the information may be retrieved and analyzed in order to properly identify the cables and their spatial orientation.

The buffer memory 33 may, depending on its size, store only a pixel, one line or a group of lines. Once the buffer memory is full, its information is transferred sequentially to the means for storing the digital information 51, which in this case is a hard disk drive.

The configuration of the camera described above is particularly suited for panoramic imaging. When the user is next to the camera, it may be activated directly. However, when the camera is used for mapping an underground access well of a hydroelectric company, there may exist such dangerous or physical conditions that prevent a person from being in the access well. A remote control system is thus provided.

To that effect, the first section 3 of the housing is fastened at the lower portion 61 of a shaft 60 as mentioned above. The shaft 60 has an upper portion 63, which may be provided with a section 65 adapted to replace a manhole cover. This section 65 may be further provided with an orientation arrow 67 for positioning the camera towards the north when mapping is effected.

The shaft 60 is hollow and includes a central passage 69 through which a coaxial cable 83 is inserted (see FIG. 8). The communications module 39 is connected to a slip ring 81, as is the coaxial cable 83. In such manner, the camera 1 can be remotely controlled with a unit 91 communicating with the camera 1. Preferably, the communication between the unit 91 and the camera 1 is serial. In order to avoid having a plurality of slip rings or to have slip rings with a plurality of connectors, the camera 1 and the unit 91 are further provided with direction changing modules for communication. Thus, a bi-directional communication link can be established between the unit 91 and the camera 1.

Advantageously, the camera 1 may include a lighting system 9, when the camera is used in dark places, such as an access well for underground cables, i.e. electric, telephone, television cable. As shown on FIG. 4, this lighting system preferably comprises two identical parabolic units 201.

Since the second section 5 of the housing 10 is driven in rotation, it is essential that, if such a lighting system is present, it must be mounted on the second section 5 of the housing 10 to provide direct lighting over the full 360° of rotation of the second section 5 of the housing 10. In order to save energy and provide uniform lighting, the light beams are preferably narrow and vertical.

Figure 5:
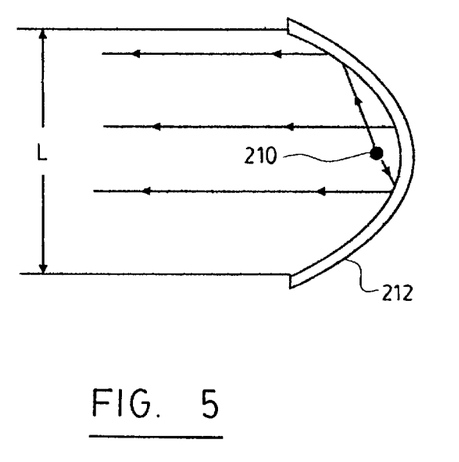
FIG. 5 is a cross-sectional view of one of the reflectors of the camera.
Figure 6:
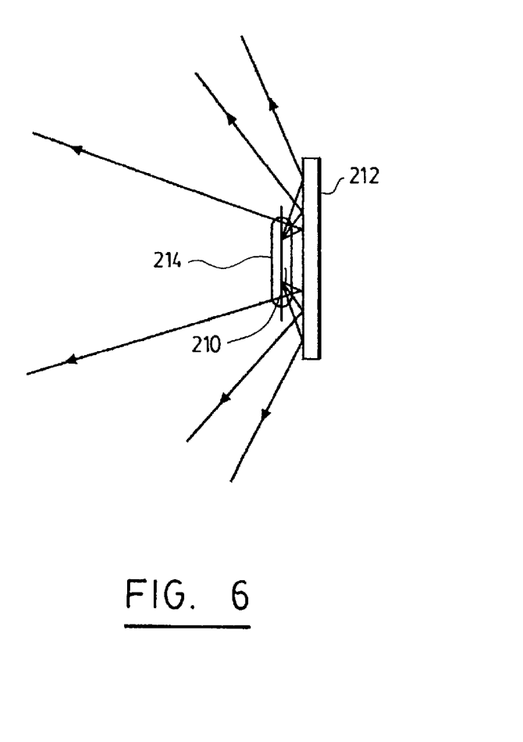
FIG. 6 is a side view of the reflector of FIG. 5.
Figure 7:
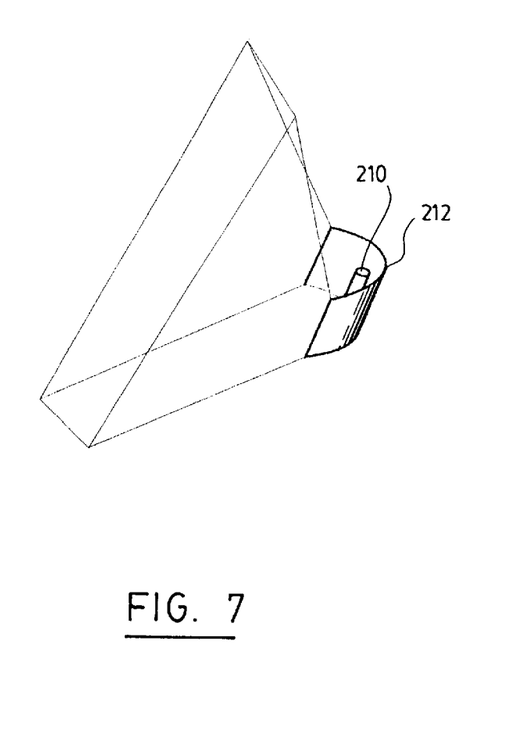
FIG. 7 is a schematic representation of the light beam emitted by the reflector of FIG. 5.

FIG. 5 shows that a light source 210 placed at the focal point of a parabolic reflector 212 produces a light beam having a width L along the height of the parabolic reflector 212. If the reflector is cylindrical, the width of the beam remains L but on the vertical plane, the reflector acts as a flat mirror and produces a wide angle beam as shown on FIGS. 6 and 7. Thus, if a linear lightbulb 210 is used as a light source, the resulting beam will have the shape shown on FIG. 7.

Each of the parabolic units may, theoretically, produce a beam of 180°. Practically however, the resulting beam is not efficient over the full beam. Furthermore, in order to obtain sufficient lighting and to have a minimum of shadows, the lighting system 9 must be parallel to the axis of rotation 2 of the camera 1. As previously mentioned, two units 201 are used, one above the lens 7 and one below the lens 7. In order to have a light beam of at least 180°, each of the parabolic units are inclined by an angle of approximately 30° with respect to the vertical, as shown on FIGS. 1 and 4.

Preferably, to avoid direct illumination, the linear lightbulbs 210 are covered by a metal strip 214 placed in front of the lightbulb 210.

The camera 1 is preferably powered by a battery (not shown); however, it could also be powered by a cable.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A panoramic camera comprising:

a housing having a longitudinal axis and including a first section coaxial with said longitudinal axis and a second section also coaxial with said axis, said second section being driven in rotation about said longitudinal axis with respect to said first section;

means for driving in rotation said second section of said housing;

a lens mounted on said second section of said housing, an optical axis of said lens being perpendicular and radial to said longitudinal axis;

a linear CCD array placed at the focal point of said lens in order to capture images transmitted by said lens, said linear CCD array having an input for a control signal and an analog signal output representing one line of said image;

an analog-to-digital converter operatively connected to said linear CCD array for converting said analog signal output of said linear CCD array into a digital information, said converter having an input for said analog signal, an input for a control signal and an output for digital information;

means for storing said digital information operatively connected to said converter;

means for encoding the azimuth of said camera, having an output for data corresponding to said azimuth; and a control system for controlling said rotation of said housing, for sending a control signal to said analog-to-digital converter to digitize said image and for sending a control signal to said means for storing said digital information sent by said converter;

whereby, when said second section is driven into rotation, said control system sends a control signal to said converter at regular intervals to indicate to said converter that said image is to be digitized and to send a signal to said means for storing said digital information to store said digital information sequentially and including said data corresponding to said azimuth.

2. A panoramic camera according to claim 1, wherein said lens is a wide angle lens.

3. A panoramic camera according to claim 2, wherein said camera further comprises a light source shaped into a linear beam including two parabolic units being parallel and radial to said longitudinal axis and placed above and below said lens.

4. A panoramic camera according to claim 3, wherein:

said first section of said housing further comprises a shaft coaxial to said longitudinal axis, said shaft having an upper portion and a lower portion;

said second section of said housing being attached to said first section by means of a ball bearing connected to said lower portion of said shaft.

5. A panoramic camera according to claim 4, wherein said means to encode said azimuth include:

an azimuth wheel fastened to the periphery of said lower portion of said shaft; and an azimuth encoder having an input operatively connected to said azimuth wheel and an output operatively connected to said control system, to align said camera with respect to a predetermined direction and to encode said image with data outputted by said azimuth encoder.

6. A panoramic camera according to claim 5, wherein said means to drive into rotation said second section of said housing include:

a bearing comprised of a first wheel coaxial with said longitudinal axis, said wheel having a predetermined diameter and a circumference, said first wheel being fastened to said first section of said housing, and a second wheel having a diameter much smaller than said diameter of said first wheel, said second wheel being adapted to travel along said circumference of said first wheel, said second wheel having an axis of rotation parallel to said longitudinal axis; and an electric motor responsive to a control signal and having an output axis operatively connected to said second wheel to drive said second wheel into rotation with respect to said first wheel, said electric motor being fixed to said second section of said housing and said control signal being sent from said control system.

7. A panoramic camera according to claim 5, wherein said means to drive into rotation said second section of said housing comprise:

a worm gear including an endless screw and a wheel, said wheel being coaxial with said longitudinal axis and fastened to said first section of said housing, said endless screw being fastened to an electric motor fixed on said second section of said housing, said motor being responsive to a control signal sent from said control system.

8. A panoramic camera according to claim 6, wherein:

said control system further includes an input for remote control;

said shaft is hollow, defining a central passage, and includes a coaxial cable inside said passage, said cable having one end electrically connected to a slip ring located at the lower portion of said shaft;

said control system being also connected to said slip ring.

9. A panoramic camera according to claim 8, wherein said control system is a micro-computer.

10. A panoramic camera according to claim 9, wherein said means to store said digital information is a hard disk drive.

11. A panoramic camera according to claim 7, wherein:

said control system further includes an input for remote control;

said shaft is hollow, defining a central passage, and includes a coaxial cable inside said passage, said cable having one end electrically connected to a slip ring located at the lower portion of said shaft;

said control system being also connected to said slip ring.

12. A panoramic camera according to claim 11, wherein said control system is a micro-computer.

13. A panoramic camera according to claim 12, wherein said means to store said digital information is a hard disk drive.

14. A panoramic camera according to claim 1, wherein said camera further comprises a light source shaped into a linear beam including two parabolic units being parallel and radial to said longitudinal axis and placed above and below said lens.

15. A panoramic camera according to claim 1, wherein:

said first section of said housing further comprises a shaft coaxial to said longitudinal axis, said shaft having an upper portion and a lower portion;

said second section of said housing being attached to said first section by means of a ball bearing connected to said lower portion of said shaft.

16. A panoramic camera according to claim 2, wherein:

said first section of said housing further comprises a shaft coaxial to said longitudinal axis, said shaft having an upper portion and a lower portion;

said second section of said housing being attached to said first section by means of a ball bearing connected to said lower portion of said shaft.

17. A panoramic camera according to claim 1, wherein said means to encode said azimuth include:

an azimuth wheel fastened to the periphery of said lower portion of said shaft; and an azimuth encoder having an input operatively connected to said azimuth wheel and an output operatively connected to said control system, to align said camera with respect to a predetermined direction and to encode said image with data outputted by said azimuth encoder.

18. A panoramic camera according to claim 2, wherein said means to encode said azimuth include:

an azimuth wheel fastened to the periphery of said lower portion of said shaft; and an azimuth encoder having an input operatively connected to said azimuth wheel and an output operatively connected to said control system, to align said camera with respect to a predetermined direction and to encode said image with data outputted by said azimuth encoder.

19. A panoramic camera according to claim 3, wherein said means to encode said azimuth include:

an azimuth wheel fastened to the periphery of said lower portion of said shaft; and an azimuth encoder having an input operatively connected to said azimuth wheel and an output operatively connected to said control system, to align said camera with respect to a predetermined direction and to encode said image with data outputted by said azimuth encoder.

* * * * *